April 14, 1931.  W. E. FOLTZ  1,801,246
PORTABLE WINCH
Filed April 21, 1926    3 Sheets-Sheet 2

Inventor
William E. Foltz

By G. A. Lovett
Attorney

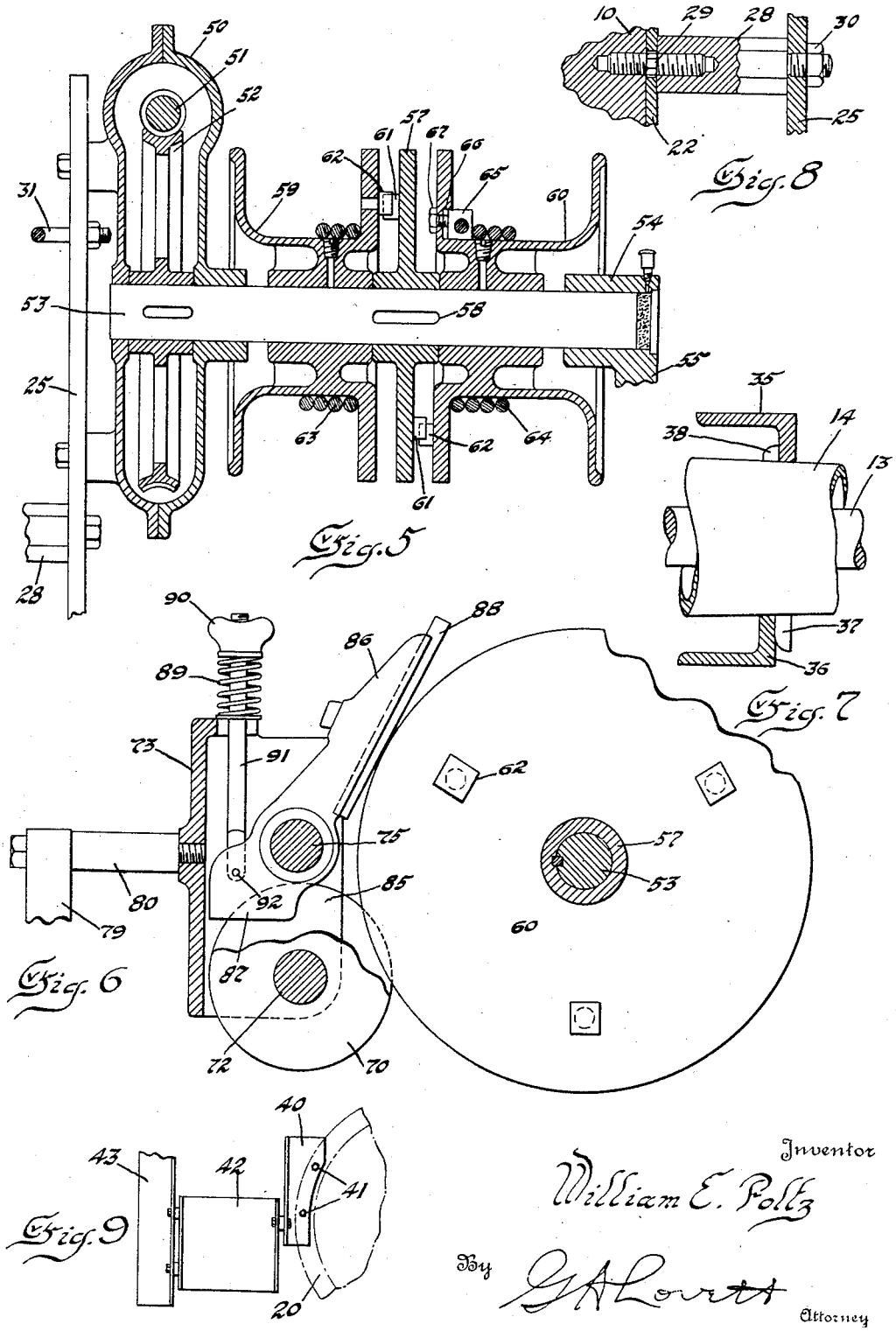

Patented Apr. 14, 1931

1,801,246

UNITED STATES PATENT OFFICE

WILLIAM E. FOLTZ, OF DETROIT, MICHIGAN, ASSIGNOR, BY MESNE ASSIGNMENTS, TO THE SIDNEY STEEL SCRAPER COMPANY, OF SIDNEY, OHIO, A CORPORATION OF NEW JERSEY

PORTABLE WINCH

Application filed April 21, 1926. Serial No. 103,452.

The invention relates to portable winches and particularly to those of the type adapted to be mounted upon a tractor and actuated by the power plant thereof. While in some respects of more generic application, the invention has been especially designed for use in connection with, and will be herein described as applied to, a tractor of the well-known Fordson type.

The principal object of the invention is to provide a cable-hauling mechanism adapted to be mounted upon the tractor without modification of the structure of the latter and readily removable when desired. A further object is to provide means for actuating the said mechanism from the power plant of the tractor without interfering in any way with the simultaneous or alternative use of the power plant in propelling the tractor. Other objects and advantages will appear from the following description taken in connection with the accompanying drawings, in which Fig. 1 is a plan view of one embodiment of the invention mounted upon a tractor;

Fig. 5 is a vertical section on line 5—5 of Fig. 1;

Fig. 6 is a vertical section on line 6—6 of Fig. 1;

Fig. 7 is a detail view on line 7—7 of Fig. 2 showing a support cooperating with the tractor axle housing;

Fig. 8 is a detail of a supporting and spacing stud;

Fig. 9 is a detail view of an auxiliary support for a part of the structure, and Fig. 10 is a vertical section through a part of the shifter mechanism.

Figure 3:
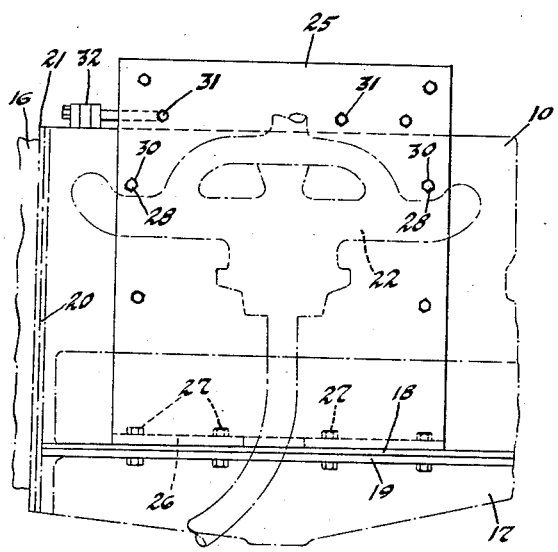
Fig. 3 is a side elevation showing a supporting plate and the means for attachment of the plate to the tractor.
Figure 4:
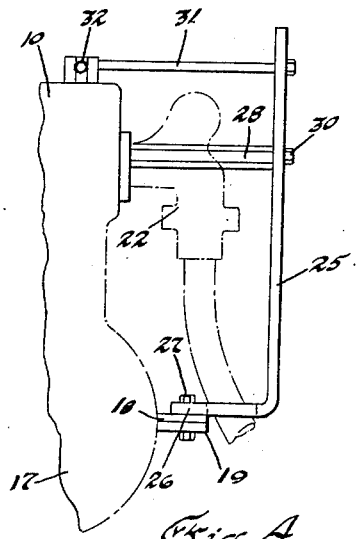
Fig. 4 is an end elevation of the structure of Fig. 3.

Referring to the drawings, 10 indicates the engine of a tractor illustrated as the internal combustion engine of the conventional Fordson. The tractor includes the usual front or steering wheels 11 and rear or driving wheels 12, the latter being driven by axle 13 mounted within the axle housing 14. The axle is driven from the engine by transmission shaft 15, acting through the usual change speed mechanism housed within the transmission casing 16. To the lower part of the cylinder block of engine 10 is secured the crank casing section 17 by bolts passing through the respective flanges 18, 19. The engine block and transmission casing are similarly secured together by means of the flange 20 on the block and flange 21 on the casing. (Figs. 3–4.) The rear axle housing and the engine and transmission casings constitute, in effect, the frame of the tractor. The engine is provided with a fuel system indicated generically at 22 which includes the carburetor and intake and exhaust manifolds. These tractor parts, of course, as shown are the usual elements of the Fordson tractor but are referred to herein specifically for the reason that I utilize said elements to cooperate with the supporting and driving means of the cable-hauling mechanism which forms an attachment for the tractor.

As the principal supporting and attaching element for the winch I provide a vertically disposed base plate 25 having a flange 26 at its lower edge. This flange is adapted to rest upon the flange 18 of the engine block and may be secured thereto by bolts 27 which replace the usual bolts for securing the crank casing to the engine block. An additional support is provided for the base plate by the spacers or studs 28 which are formed with tapped holes at one end to fit the manifold studs 29. (See Fig. 8.) The outer end of the spacer is reduced to form a shoulder to rest against the inside of plate 25 and the reduced end extending through the plate is threaded to receive nuts 30 whereby the plate is clamped to the spacer.

The base plate is further braced by rods 31 which are secured in holes in the plate near its upper corners and extend divergently to the cylinder head of the engine. The inner ends of these rods pass through holes bored diametrically through the heads of bolts 32 which are formed with enlarged heads for this purpose, and replace two of the usual cylinder head bolts. Nuts on the ends of rods 31 provide for adjusting the rods to the desired tension.

An additional means for supporting the cable-hauling mechanism and attaching same to the tractor is provided by a frame member extending longitudinally of the tractor and comprising two angle bars 35, 36, which are superposed as shown in Fig. 7 to constitute in effect a channel bar. The bar 35 is slotted upwardly from the lower edge at 37 and the bar 36 downwardly from the upper edge at 38 to fit over the rear axle housing adjacent to the rear ground wheel 12. Hence when the two bars are positioned over the rear axle and secured together in any suitable manner, as by bolts 39, they are rigidly supported against vertical displacement by their engagement with the axle housing.

An additional support for frame members 35, 36, is provided by bracket plate 40, (Fig. 9,) attached to the flange 20 of the engine block by bolts 41. The bracket 40 carries, through an intermediate spacing plate 42, a vertically extending post of angle iron 43, secured to the outer face of frame member 35. Another angle bar 45 is secured to post 43 and to frame member 35 (Fig. 2,) and extends horizontally outward to support guide pulleys and a brace for the outer end of the winch shaft, as later described. The frame members 35, 36, may also be braced and spaced from the tractor frame at the rear end by bolts 46 engaging in the bolt holes provided for securing the rear axle housing 14 to the differential casing 47 and by the brace 48 secured at one end to bar 35 and at the other to the drawbar cap 49.

Figure 1:
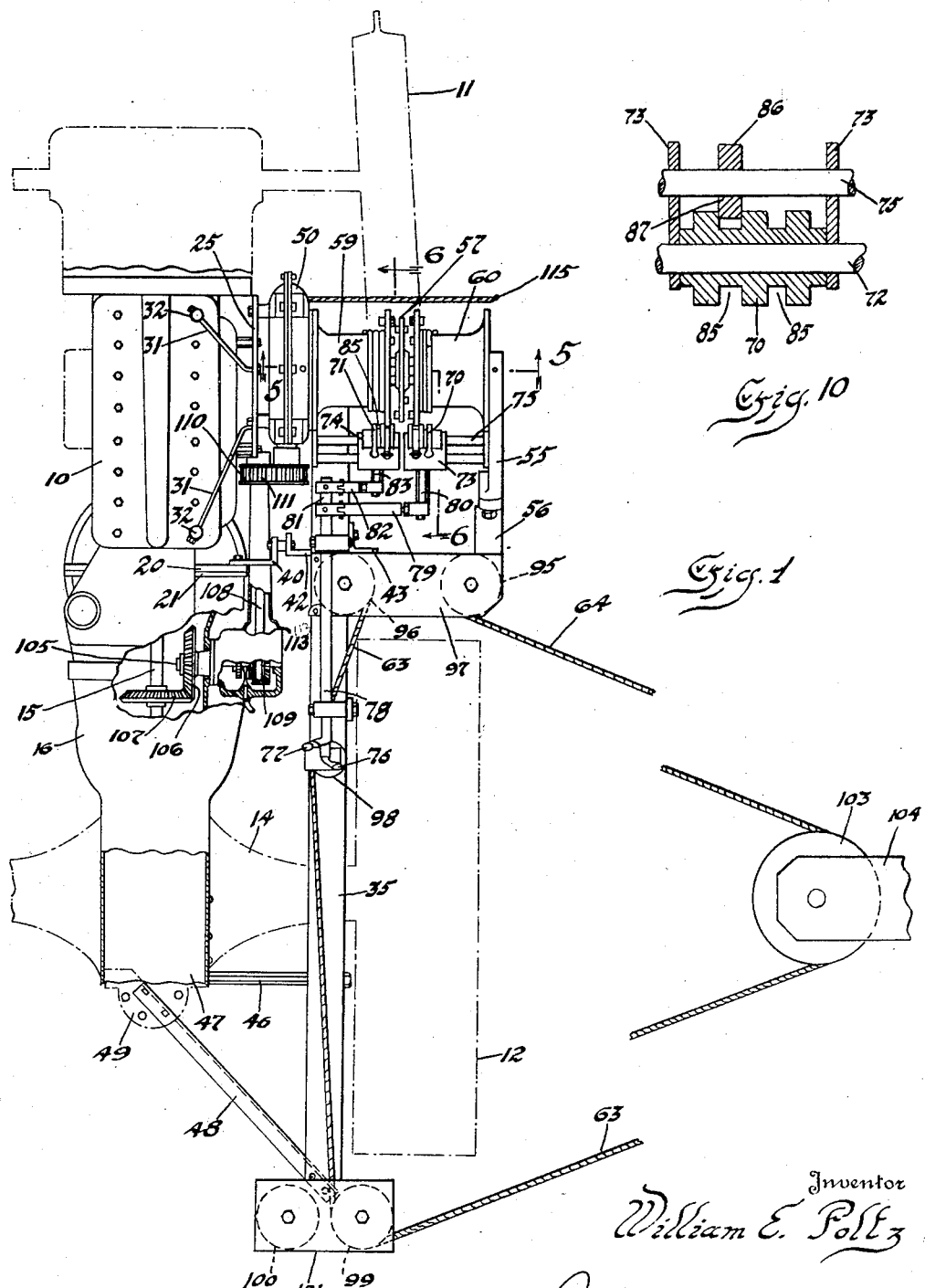
Figure 2:
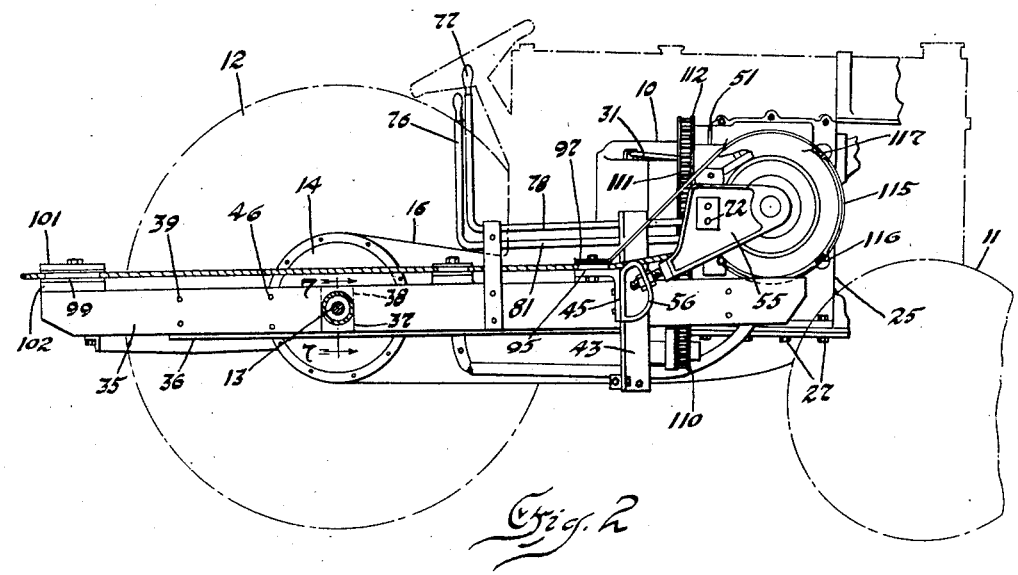
Fig. 2 is a side elevation of the structure shown in Fig. 1.

The winch frame comprising gear casing 50 is bolted directly to plate 25, (Figs. 1 and 5). The casing encloses and provides bearings for the worm 51 and worm wheel 52. The shaft 53 of the worm wheel extends outwardly and is received at its outer end in a bearing 54 carried by, or forming part of, a bracket 55 adjustably connected, as shown in Fig. 2, to a support 56 carried by the outer end of bar 45. Between the casing 50 and bearings 54 the shaft 53 carries a clutch member 57, keyed to the shaft at 58, and two cable drums or spools 59, 60, rotatable and slidable on the shaft. Clutch lugs 61 on the clutch disk 57 are adapted to engage similar lugs 62 on the adjoining faces of the drums 59, 60, when the drums are shifted toward the clutch disk, and thereby cause rotation of the drums. Cables may be wound upon each drum as indicated at 63, 64. The end of the cable is preferably secured to the drum in any suitable manner, as by positioning the end of the cable in an aperture in the head of a bolt 65, passing through the flange of the drum, the head being adapted to be drawn into a recess 66 by the action of the nut 67. By drawing the bolt up tightly the cable end is clamped against the side of the spool and is held firmly.

The shifting of the drums into or out of engagement with the clutch disk 57 is effected by a pair of shifter spools 70, 71, slidably mounted upon a shaft or rod 72 and positioned thereon by engagement with the sides of box-like shifter forks 73, 74, also slidably mounted upon the rod 72. An additional rod 75 may be provided to position and guide the shifter forks and the rods 72, 75, may be suitably supported at their ends in the frame members as in the bracket 55. The shifter forks are actuated by hand levers 76, 77, arranged at a point convenient for operation by the driver of the tractor. Lever 77 is connected to an oscillatory bar 78, the forward end of which is connected by link 79 to a stud or post 80 on shifter fork 73. Lever 76 is similarly connected through bar 81 and link 82 to post 83 on shifter fork 74. The shifter spools 70, 71, are preferably provided with two annular grooves 85, in one of which grooves the flange of the cable drum or spool engages. The provision of two grooves enables the spool to be reversed when one groove becomes worn. By actuation of the shifter lever the shifter forks may be caused to move outwardly or inwardly, carrying with them the shifter spools and thereby causing the cable drums to move into or out of driving engagement with the clutch member 57. It will be noted that since the drums are independently shiftable either may be brought into engagement with the clutch member independently of the other or both at the same time. In practice, however, it would be preferable generally to permit one of the cables to be drawn out at the time when the other is being hauled in, and for this reason it is desirable to have one drum in driving engagement when the other drum is free to rotate upon its supporting shaft. This may be accomplished by shifting the drums simultaneously in the same direction, and the positioning of the levers 76, 77, closely adjacent to each other enables such shifting to be effected by the operator from his seat on the tractor with one hand and with a single motion.

It is desirable to provide means to prevent too free unwinding movement of the cable drum particularly when wire cables are employed. This is provided for by a brake member for each cable drum, the arrangement of which is shown in detail in Fig. 6. This structure comprises a brake arm 86 which may be pivotally and slidably mounted upon rod 75. A lug 87 extends from the arm into a groove 85 of a shifter spool 70 or 71, thus causing the brake arm to be shifted in unison with the shifting movement of the shifter spool and of the cable drum. A brake shoe 88 of suitable friction material is positioned in a groove in the brake arm and so located as to engage the edge of the flange of the associated cable drum. Pressure of the shoe upon the drum flange is produced by a spring 89 seated upon the upper surface of the shifter fork and acting against the nut 90 on the upper end of rod 91 pivotally connected to the brake arm at 92. The pressure of the shoe may be adjusted by the nut 90. The block of friction material 88 may be reversed in position when one end becomes worn thereby substantially doubling its life.

Guiding means for the cables is provided, which may include pulleys 95, 96, rotatably mounted upon vertical axes on the horizontal flange of frame member 45, a plate 97 being arranged to cover the pulleys and confine the cables between the plate and the member 45. Cable 64 passes from drum 60 around pulley 95 and thence outwardly to the load which may be any object to be hauled, for example, a scraper or trench filler. Cable 63 passes rearwardly from drum 59 to pulley 96 and thence to a pulley 98 on frame member 35. The cable then passes between additional guide pulleys 99, 100, secured between plates 101, 102, on the rear end of member 35. From these pulleys the cable extends to the load. If desired, the outer ends of the cables may be connected to constitute a single cable as shown in Fig. 1 and may be arranged to pass around a pulley 103 on a fixed support 104. By this arrangement one cable is drawn out by the winding up of the other. Such arrangement would be of especial utility, for example, in excavating cellars or the like, where one implement may be drawn back while the other is moving toward the tractor. Whether single or double cables are employed, it will be seen by inspection of Fig. 1 that the mechanism provides for the performance of work over a wide area without changing the position of the tractor, since the cable 64 may extend in any direction within an arc of approximately 180°, while the cable 63 may swing through an even greater arc.

In order to actuate the cable-hauling apparatus from the power plant of the tractor itself I utilize the usual form of power take-off mechanism including the shaft 105 which is driven by gears 106, 107, from the main transmission shaft 15. The power take-off shaft is arranged to drive shaft 108 through gearing 109, which may comprise, if desired, a means for driving shaft 108 at two or more different speeds. On the forward end of shaft 108 is a sprocket 110 with which sprocket chain 111 engages. The chain also engages with sprocket 112 which is fixed to the end of worm shaft 51. The power take-off shaft 105 together with the gearing 109, shaft 108, and sprocket 110, may be mounted, as shown, in a casing 113 so as to constitute a single power transmission unit adapted to be secured to the tractor frame or casing in the same manner as the usual pulley attachment provided for the Fordson tractor and requires no modification of the tractor structure, per se.

Since the power take-off shaft may be controlled by the usual clutch mechanism of the tractor to be driven, either simultaneously with or independently of the ground wheels, the cable-hauling mechanism may be actuated either while the tractor is traveling or when it is stationary. The mechanism is therefore adapted for use for many different purposes including the pulling of the tractor itself out of mud or holes, the loading of trailers, the "back-filling" of ditches or trenches, etc. It will be understood, of course, that for some of these uses the cable or cables may pass directly to the load or over other guiding means than that illustrated, for example, in hoisting loads, the cables would pass over elevated pulleys upon a boom or derrick. For some uses also the mechanism might include only a single drum.

If desired the drums may be suitably covered, as by a casing member 115, (Figs. 1 and 2,) supported upon rods 116, 117, from which it is removable by sliding it laterally away from the tractor. The rear end of the casing may be secured to plate 97.

While I have herein shown and described the driving mechanism as adapted to actuate a pair of cable drums, it will be understood that one or both of the said drums may be replaced by other forms of power transmitting devices. Additional devices to be driven may, of course, be arranged to be driven by the mechanism without eliminating either of the cable drums as, for example, by connecting same to the shaft 53. Other changes in details of construction may be made without departing from the scope of the invention and therefore I do not wish to be limited to the specific structure herein described except as required by the language of the appended claims in view of the prior art.

I claim:

1. The combination with a tractor having front and rear ground wheels, engine and transmission casings constituting a frame for said tractor and power take-off means, of a winch frame comprising a plate secured to said casings on one side of the tractor, a winch secured to said plate and extending laterally from the tractor between the front and rear ground wheels, and means for actuating said winch driven by said power take-off means from the engine of the tractor.

2. The combination with a tractor having front and rear ground wheels, and engine and transmission casings constituting a frame for said tractor, of a winch frame comprising a vertical plate secured to said casings on one side of the tractor between the front and rear wheels and a brace bar connecting said plate to the rear axle of the tractor, said frame being attachable to or removable from the tractor as a whole, and a winch carried upon said plate.

3. The combination with a tractor having front and rear ground wheels and tractor control means of a winch attachment therefor comprising a frame detachably secured to the tractor on one side thereof between the front and rear ground wheels and two cable winding drums supported upon said frame, means for actuating said drums from the engine of the tractor and control means for said actuating means including a separate control device for each drum, said control devices being adapted for independent operation and positioned to be actuated simultaneously by one hand of the operator.

4. A winch attachment for a tractor comprising a frame attachable to the tractor, a driving shaft supported upon said frame and arranged to be driven by the engine of said tractor, a central clutch member secured to said shaft, two cable drums slidable on said shaft, one on each side of said clutch member, a shifting member for each drum, a brake engageable with each drum and shiftable laterally with the drum and means actuable by the shifting movement of said shifting members for shifting said brakes laterally.

5. A unitary winch structure constituting an attachment adapted to be mounted upon a tractor, comprising a winch frame, means for supporting the winch frame as a unit wholly from one side of the tractor between the front and rear wheels thereof, said means including a plate and means for securing the plate to the side of the tractor, a winding drum supported in said frame, and means for actuating said drum from the power take-off devices of the tractor.

6. The combination with a tractor having front and rear ground wheels, and engine and transmission casings constituting a frame for said tractor, of a winch frame secured to and supported by said tractor frame on one side only of said tractor, and a winch carried by said winch frame and situated between said front and rear ground wheels, said winch frame comprising a vertically extending plate secured to the said engine and transmission casings, the said winch extending outwardly from the said plate with its axis transverse to the direction of travel of the tractor.

7. The combination with a tractor having front and rear ground wheels and a tractor frame connecting said wheels, of a winch frame secured to and detachably supported by said tractor frame on one side only of said tractor and a winch carried by said frame and situated between said front and rear ground wheels, said winch frame comprising a vertically disposed base plate by which the winch is carried which base plate is attached to the side of the tractor frame between the front and rear ground wheels thereof.

8. The combination with a tractor having front and rear ground wheels and a frame connecting said wheels, of a winch structure comprising a winding drum, clutch and brake mechanism therefor, means for controlling said mechanism, and means for actuating said drum adapted to be driven from the driving mechanism of the tractor, and a winch frame upon which the drum, clutch and brake mechanism, and controlling and actuating means are all carried, said winch structure constituting a self-contained unit adapted to be mounted between the front and rear wheels of the tractor on one side of the frame thereof, and means for attaching said winch frame to the side of the tractor frame between the front and rear wheels thereof and supporting said winch frame wholly from the side of said tractor frame.

9. The combination with a tractor having front and rear ground wheels, a frame connecting said wheels, and power take-off means, of a unitary winch structure comprising a winch frame, a pair of drums, means for driving said drums from the power take-off, a pair of hand levers for controlling said drums, means for securing said winch frame to the tractor frame with said levers positioned to be actuated from the driver's station of the tractor, said levers being so arranged as to be actuable both by one hand of the driver or separately, the controlling devices being so arranged that the simultaneous actuation of said levers in one direction causes one drum to be connected to the driving mechanism and the other to be released therefrom.

10. The combination with a tractor having front and rear ground wheels, a frame connecting said wheels, and a power take-off, of a winch comprising, as a unitary structure attachable to and removable from said tractor frame as a unit, a winch frame, a pair of drums, means for driving said drums from said power take-off, control devices for said drums adapted to extend, when the structure is mounted upon the tractor, in proximity to the driver's station of the tractor, means for enclosing said drums and driving means, means for guiding cables to said drums from without said enclosing means, and means for securing said winch frame to the tractor frame on the side thereof with said drums positioned between the front and rear ground wheels of the tractor.

11. The combination with a tractor having front and rear ground wheels and a frame connecting said wheels, of a unitary winch structure comprising a winch frame, means for securing said frame to the tractor frame on one side thereof between the front and rear wheels, a pair of drums mounted on said winch frame, a cable on each drum, means for guiding said cables to the drums from the side of the tractor, means for driving said drums from the power plant of the tractor, and means for controlling the actuation of said drums whereby one drum may be actuated to wind up and the other to pay out cable, or each drum may be actuated to wind up or pay out cable independently of the other.

In testimony whereof I affix my signature.

WILLIAM E. FOLTZ.